No. 687,595. Patented Nov. 26, 1901.
C. E. BLUE.
MACHINE FOR THE MANUFACTURE OF GLASSWARE.
(Application filed Dec. 11, 1899.)
(No Model.) 5 Sheets—Sheet 1.

Witnesses
Geo. E. Fitch
Chas. R. Wright Jr.

Inventor
C. E. Blue
by A. S. Pattison,
Attorney

No. 687,595. Patented Nov. 26, 1901.
C. E. BLUE.
MACHINE FOR THE MANUFACTURE OF GLASSWARE.
(Application filed Dec. 11, 1899.)
(No Model.) 5 Sheets—Sheet 2.

Witnesses
Geo. E. Frech.
Chas. R. Wright Jr.

Inventor
C. E. Blue,
by A. S. Pattison,
Attorney.

No. 687,595. Patented Nov. 26, 1901.
C. E. BLUE.
MACHINE FOR THE MANUFACTURE OF GLASSWARE.
(Application filed Dec. 11, 1899.)
(No Model.) 5 Sheets—Sheet 3.

Witnesses
Geo. E. Frech
Chas. R. Wright

Inventor
C. E. Blue,
by A. S. Pattison,
Attorney.

No. 687,595. Patented Nov. 26, 1901.
C. E. BLUE.
MACHINE FOR THE MANUFACTURE OF GLASSWARE.
(Application filed Dec. 11, 1899.)
(No Model.) 5 Sheets—Sheet 4.
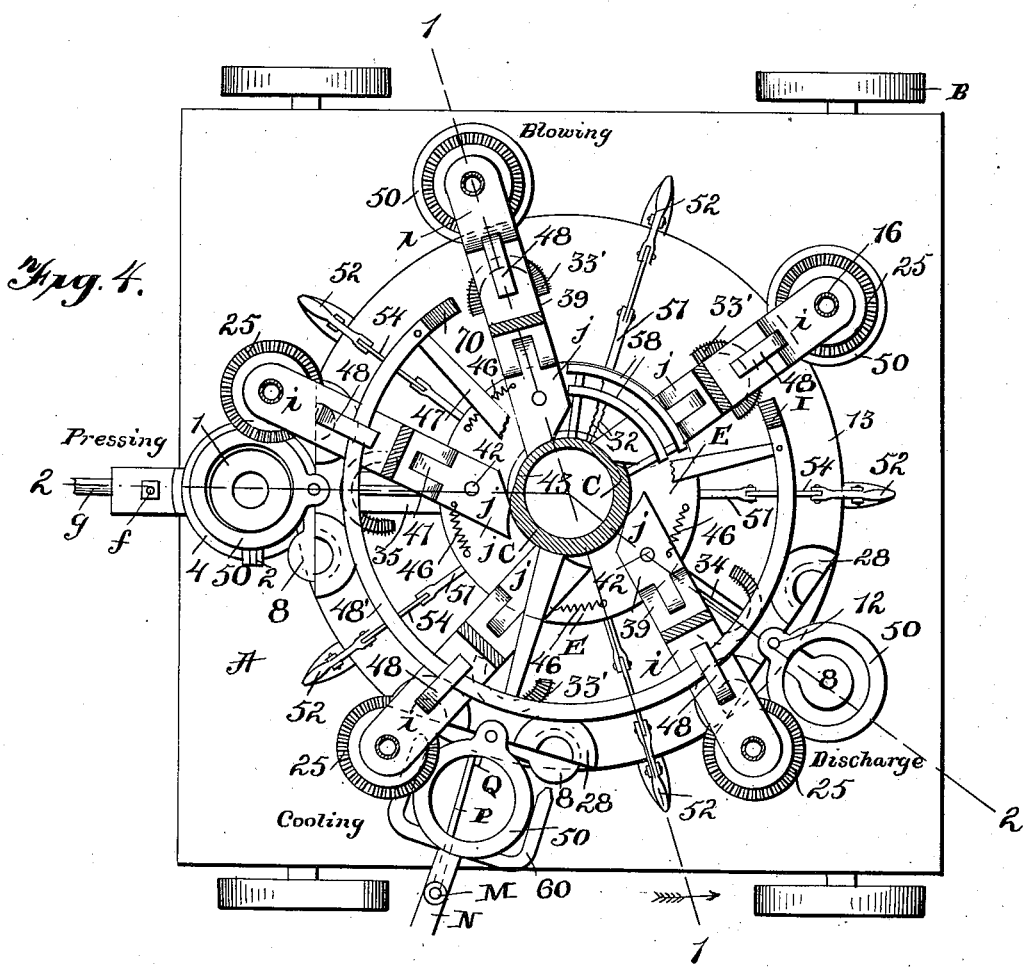
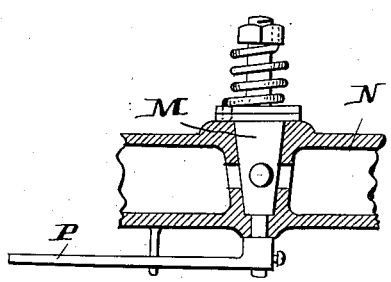
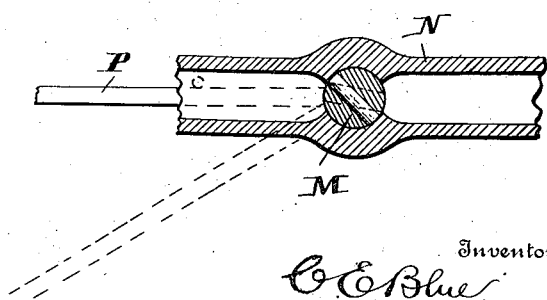
Witnesses
Geo. E. Frech.
Chas. R. Wright
Inventor
C. E. Blue,
by A. S. Pattison,
Attorney.

No. 687,595. Patented Nov. 26, 1901.
C. E. BLUE.
MACHINE FOR THE MANUFACTURE OF GLASSWARE.
(Application filed Dec. 11, 1899.)
(No Model.) 5 Sheets—Sheet 5.

Witnesses
Geo. E. Frech.
Chas. R. Wright Jr.

Inventor
C. E. Blue,
by A. S. Pattison,
Attorney.

UNITED STATES PATENT OFFICE.

CHARLES EDWIN BLUE, OF WHEELING, WEST VIRGINIA.

MACHINE FOR THE MANUFACTURE OF GLASSWARE.

SPECIFICATION forming part of Letters Patent No. 687,595, dated November 26, 1901.

Application filed December 11, 1899. Serial No. 739,987. (No model.)

*To all whom it may concern:*

Be it known that I, CHARLES EDWIN BLUE, a citizen of the United States, residing at Wheeling, in the county of Ohio and State of West Virginia, have invented new and useful Improvements in Machines for the Manufacture of Glassware, of which the following is a specification.

My invention relates to improvements in machines for the manufacture of glassware, and is especially intended for producing chimneys, blown tumblers, and seamless ware of all kinds.

Figure 1:
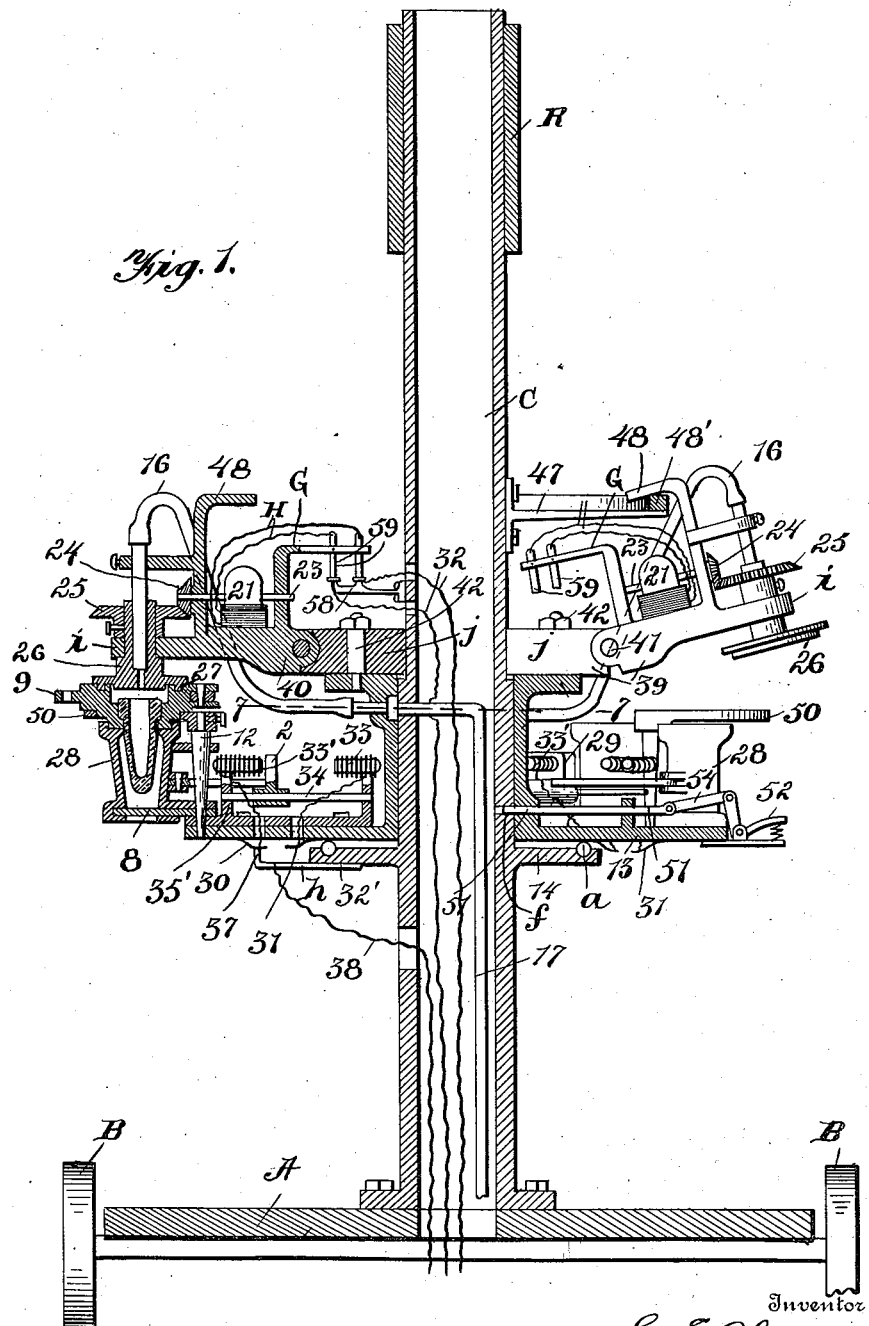
Figure 2:
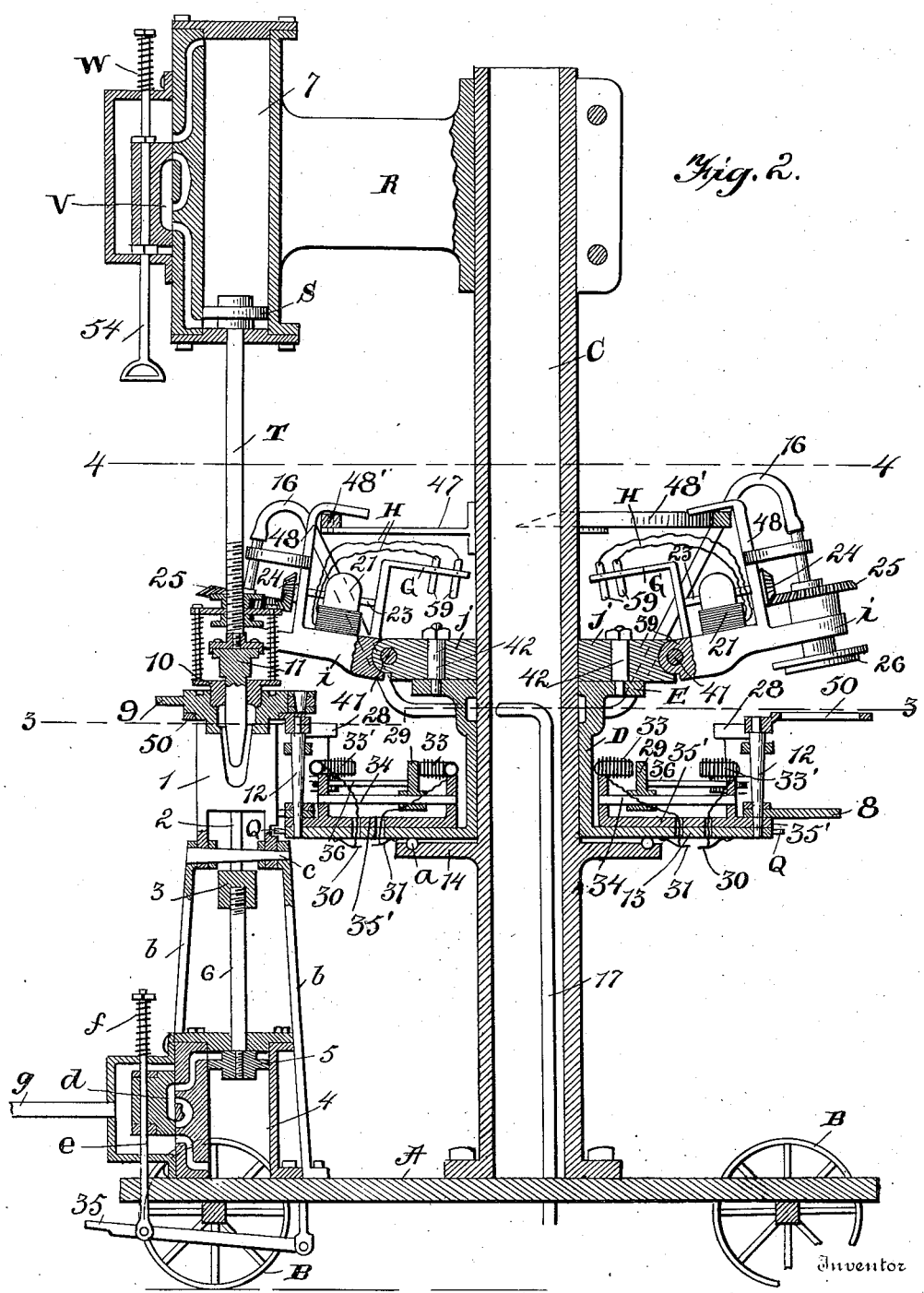
Figure 3:
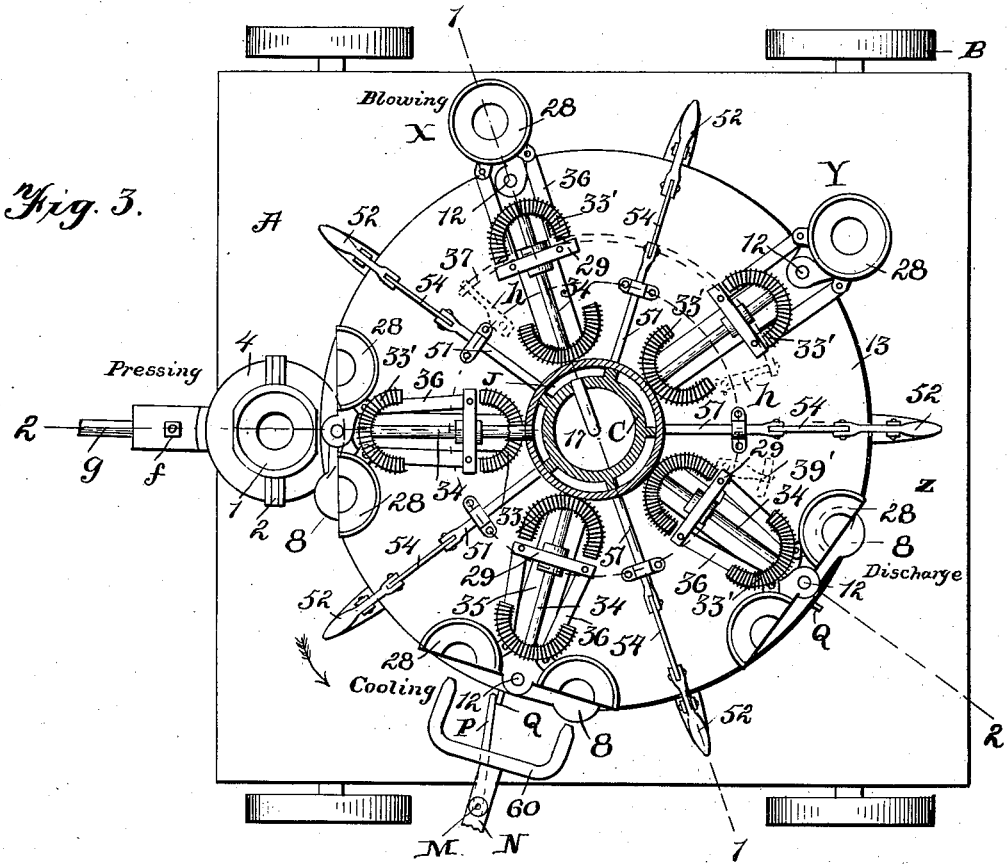
Figure 6:
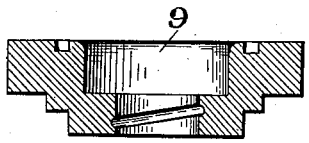
Figure 7:
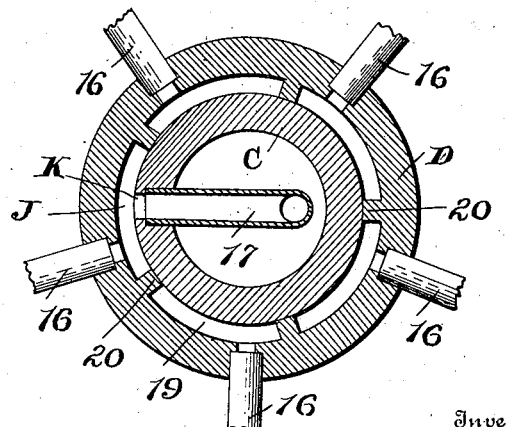
Figure 5:
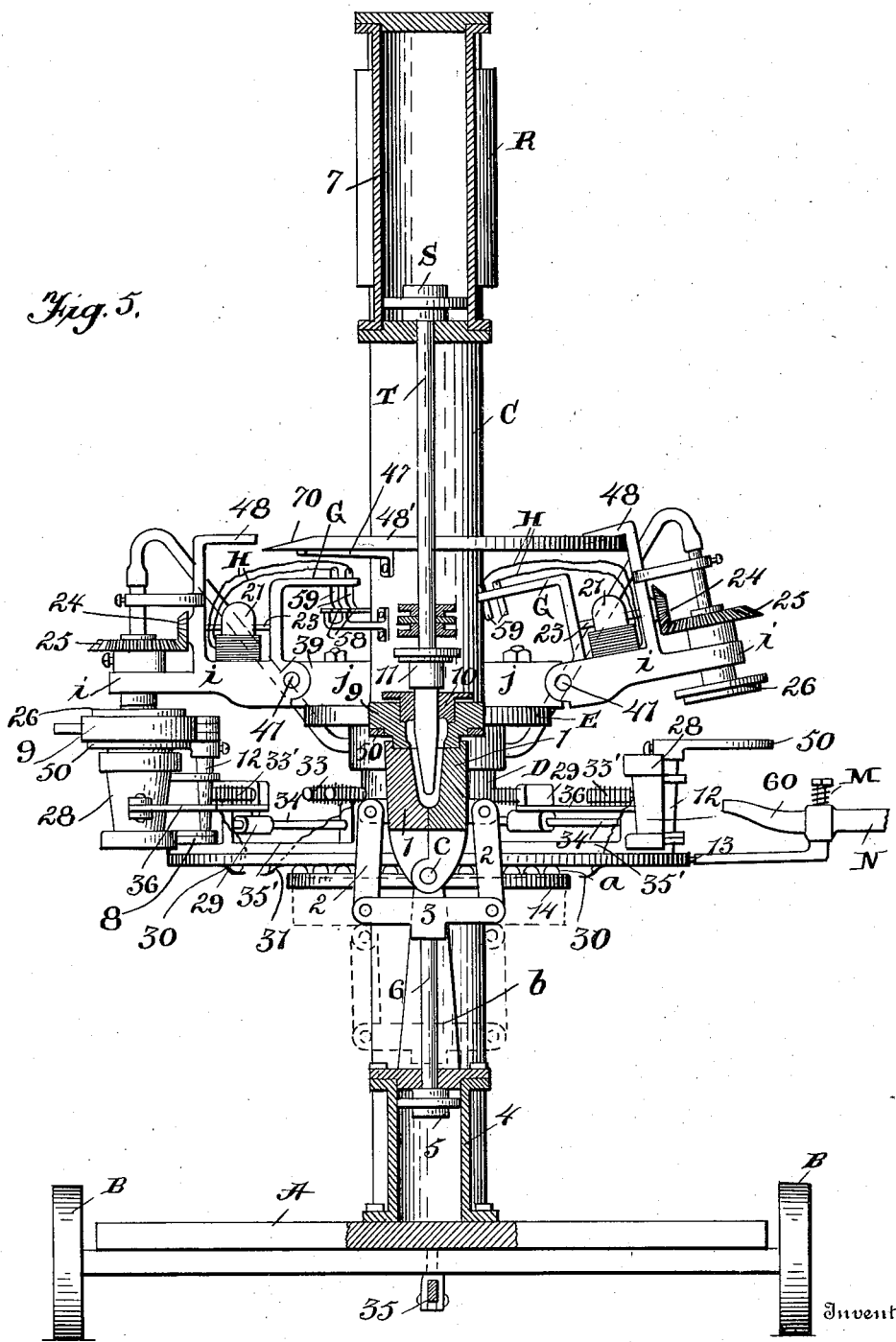

In the accompanying drawings, Figure 1 is a vertical section on the line 1 1 of Fig. 3. Fig. 2 is a similar view on line 2 2 of Fig. 3. Fig. 3 is a horizontal sectional view on line 3 3 of Fig. 2. Fig. 4 is a horizontal sectional view on line 4 4 of Fig. 2. Fig. 5 is a front elevation, partly in section, of the press-mold, showing the links and piston for opening and closing it. Fig. 6 is a detached sectional view of a solid mouth-ring. Fig. 7 is a horizontal sectional view on line 7 7 of Fig. 1. Figs. 8 and 9 are detail views of the flushing-valve.

Referring now to the drawings, A is a base, which is preferably supported upon wheels B and by means of which the machine may be readily moved around. Projecting from this base A at a suitable intermediate point is a column C, and this column C at a point above the base is provided with an outwardly-projecting lateral annular flange 14. This flange 14 supports a rotating table 13, the said table being supported by the flange 14 through the medium, preferably, of ball-bearings *a*. Projecting from the center of the rotatable table 13 and surrounding the column C is a vertical flange D, the upper end of this vertical flange being provided with a laterally-projecting horizontal flange E. The rotatable table 13 supports a plurality of blow-molds, which are preferably of that form known in the trade as "paste-molds," and also mechanism for opening and closing the said molds automatically, which mechanism will be fully explained hereinafter.

The horizontal flange E of the table 13 supports a plurality of pivoted arms 39, which have a vertical and a horizontal movement, there being one arm for each blow-mold, and these arms are automatically swung over and away from the blow-molds and automatically lowered in contact therewith and raised out of contact for a purpose and in a manner which will be fully described hereinafter. Each of these arms 39 carries mechanism for revolving the neck-ring, which ring supports and carries the pressed blank from the press-mold to the blow-mold, all of which is fully understood by those skilled in the art, and the construction of this mechanism will be fully described hereinafter.

Preferably I use one stationary press-mold 1, which is carried by a piston-rod 6, which piston-rod has its lower end connected with a piston 5, which is situated within a cylinder 4. This cylinder 4 is supported by the base A, and projecting from the base adjacent the cylinder is a standard or standards *b*, to the upper end of which the two parts of the press-mold 1 are pivotally connected, as shown at *c*. The two parts of the press-mold, which swing outward and vertically for opening and closing the molds, are connected with the piston-rod 6 through the medium of the cross-head 3 and the links 2. When the piston-rod 6 is lowered, as shown in dotted lines, Fig. 5, the press-mold is opened, and when the piston-rod is raised, as shown in solid lines, Fig. 5, the press-mold is closed, ready to receive the charge of glass to be pressed into a blank.

The table 13 carries a plurality of vertically-projecting pivotal pins 12, one for each blow-mold, and supported by the upper ends of these pins are a corresponding number of neck-ring-supporting collars or rings 50, and pivotally supported upon these pins 12 are the two parts of which the blow-molds 28 are composed and which parts are arranged to swing horizontally to be opened or closed. Also pivoted upon the lower portion of these pins 12 are the bottoms 8, which are adapted to cooperate with the molds 28 for the purpose of forming bottoms for the said molds, and these bottoms are preferably separate from the two parts of the molds, though the bottom may be otherwise arranged without affecting the spirit and scope of my invention.

The cylinder 4 is provided with a valve mechanism *d*, which is like unto an ordinary steam-engine valve, by means of which air is admitted to opposite ends of the cylinder for raising and lowering the piston 5, situated therein. Connected with the valve $d$ is a vertical rod $e$, which has its lower end connected with a treadle 35. A spring $f$ serves to hold the said valve normally upward, and consequently serving to normally admit air to the lower end of the cylinder, and hence normally holding the press-mold closed. When the treadle 35 is depressed, the piston within the cylinder 4 is forced downward, and this movement of the piston opens the press-mold for releasing the pressed blank. Air is admitted to the valve mechanism through the medium of a suitable pipe $g$, which is clearly illustrated in Fig. 2.

I will now explain the automatic mechanism for opening and closing the blow-molds 28. The devices which I prefer to use for this purpose consist of electrical mechanisms, and comprise inner electromagnets 33 and outer electromagnets 33', which are supported by U-shaped brackets or frames 35', which are secured to the table 13 just in rear of the blow-molds. Supported between the upwardly-projecting arms of this frame 35' is a horizontal shaft or rod 34, upon which reciprocates an electric armature 29, the said armature being connected with the two parts of the blow-molds through the medium of the links 36. This armature is adapted and constructed to slide back and forth between the electromagnets 33 and 33' and be actuated thereby for the purpose of opening and closing the molds. When the armature 29 is attracted by the electromagnet 33', it is drawn into the position shown in Fig. 1, which is the outward position, and when in this position the two parts of the mold are closed. When the armature 29 is attracted by the inner electromagnet 33, it is drawn inward, and through the medium of the links 36 the blow-mold is opened outward, as shown at the left-hand side of Fig. 3.

The means for automatically operating the armature 29 through the electromagnets consists in providing contact-points 30, which are electrically connected with the magnet 33', and the contact-points 31, which are connected with the magnet 33. Projecting from the flange 14 of the column C are the brackets $h$, which support a curved electric rail or brush 37, which extends partially around the table in the form of a segment, as shown, and with which the spring-contacts 30 are adapted to engage as the table 13 is being intermittently rotated. The spring-contacts 31, which are electrically connected with the magnet 33, are adapted to make contact with a short segment 39', also supported by the flange 14 of the column C and is situated just in advance of the discharging-point, as illustrated in dotted lines, Fig. 3. Each of these segments 37 and 39' is electrically connected, by means of wires 38, with any desired source of electricity for the purpose of magnetizing the electromagnets 33 and 33'. When the table reaches the position illustrated in Fig. 3, the contact 30, which operates the blow-mold situated at the point X, is in engagement with the electric brush or rail 37, thus magnetizing the electromagnet 33' and drawing the armature 29 outward in the position shown in said Fig. 3, which closes the blow-mold around the pressed blank, which has been carried from the pressing position, Fig. 3, to the position X of the same figure. As the table continues to rotate and the mold which was at the point X is carried beyond the point Y the contact 30 passes off the rail or brush 37, and when the same mold reaches the point Z, Fig. 3, the contact 31 engages the segment 39', thus magnetizing the inner armature 33 and drawing the armature 29 inward, as shown at the discharging-point, Fig. 3, which opens the mold outward, as illustrated. The mold then remains open until it reaches the point X of Fig. 3, where it is again closed, as just explained.

By referring to Fig. 4 it will be seen that I provide five pivoted arms 39, and these arms are composed of two parts, the outer portion $i$ and the inner portion $j$. The inner portion $j$ is pivoted at the point 42 to swing horizontally, and the outer portion $i$ is pivoted at the point 41 to swing vertically. The inner end of the portions $j$ of the arms 39 are adapted to engage a cam 43, which may be formed as a part of the column C or separate therefrom, as desired, and connected with the inner portion $j$ of these arms, at a point outside of their pivotal points 42, are the springs 46, which have their opposite ends connected with the table 13, as clearly shown in Fig. 4. The function of these springs is to normally hold the inner ends of the arms in contact with the cam 43, and the function of the cam 43 is to force the arms to one side of the blow-molds and of the press-mold just before reaching the discharging-point, Fig. 4, and until just before they reach the point X, Fig. 3, at which point the cam is so shaped as to permit the springs 46 to draw the arms with their outer ends over the blow-mold, as clearly illustrated in Fig. 4.

The outer ends of each of the outer portions $i$ of the arms 39 are provided with a head 26, which is provided at its under side with projections 27, adapted to enter correspondingly-shaped openings in the upper faces of the ordinary well-known two-part hinged neck-rings 9. These heads 26 serve the function of blow-heads and also as a means for rotating the neck-rings 9, and consequently the depending blank which is being blown, whereby the blank is in turn rotated and a seamless article produced. The rotation of the neck-rings 9, and consequently of the blanks or articles suspended thereby, is accomplished by making the heads 26 rotatable within the ends of the arms 39. These heads 26 have their upper ends projecting beyond the upper surface of the arms 39 and have connected therewith bevel-gears 25, which mesh with several pinions 24, carried upon the outer ends of the shafts 23, which shafts form the journals or bearings for any suitable electric motors 21. Projecting upward and inward from the outer portion of the arms 39 are the L-shaped brackets G, which carry at their inner ends electric contacts 59, said contacts being electrically connected, by means of wires H, with the opposite poles of the motor 21. These contacts 59 are adapted to engage said curved electrical contacts 58, supported by the column C, and these contacts 58 are in electrical connection, by means of wires 32, with any desired source of electricity. Also projecting upward and inward from the outer portion of the arms 39 are the brackets 48, their inner ends adapted to engage a curved track 48', (illustrated in Fig. 4,) which is carried at the outer ends of arms 47, projecting from the column C. The ends of this curved track 48' are inclined or cam-shaped for the purpose of raising the outer portion $i$ of the arms 39 at the point 70 and for the purpose of letting the said arms drop at the point I. From this it will be seen that when the arms 39 reach the point I they are permitted to drop, and prior to this they are permitted (owing to the shape of the cam 43) to assume a position which is a true radius to the circular table and with their outer ends over the blow-mold. Consequently when the arms drop at the point I the projections 27 engage the openings in the neck-rings 9, and owing to the electromagnets 33 and 33' and the armature 29 and its electrical connection heretofore described the blow-mold is closed around the suspended blank. When the table is rotated to carry the mold from the point X to the point Y, the electric contact is made, through the segment 58, with the motor 21, and this puts in operation the motor, which revolves the neck-ring 9 upon its support 50, and consequently revolves the blank from which the article is being blown. The rotation of this article continues from the point X to the point Y, and during this period air is being admitted through the blow-head 26 in a manner which I will now describe. The sleeve D, projecting from the table 13, is provided with a space 19, and this space is divided into five chambers through the medium of the partitions 20, and each of these chambers is provided with a communication 16 through means of a pipe to each of the blow-heads 26. Passing through the column C is an air-pipe 17 in communication with any desired source of air-pressure, and this pipe 17 is in communication with the chamber J, and this pipe projects through the column C at the point K, which is between the points X and Y, Fig. 3, so that air is being admitted to that chamber which is in communication with the end of the pipe J from the said points X and Y and air is being admitted to the blow-mold as it is being carried from said points and during which period the blown blank is being rotated, as before explained. From this description it will be noted that air is automatically admitted and cut-off from the blow-mold, that the blow-heads are automatically raised and lowered, that the neck-rings are automatically rotated during the blowing operation, and that the blow-molds are automatically opened and closed.

The table 13 is provided with a number of operating-handles 52, corresponding to the number of blow-molds and situated therebetween, as illustrated in Fig. 3. These handles 52 are connected, by means of links 54, with pins 51, which pass through the sleeve D of the table 13 and are adapted to enter an opening $f$ in the column C. The purpose of these handles is to provide means for rotating the table and for locking it at the proper point for the pressing, blowing, and discharging operations.

In Fig. 6 I show a sectional view of a solid neck-ring provided with a thread, which may be substituted for the two-part neck-ring 9 heretofore described.

I find it advantageous to cool the blow-molds between the blowing operations. This is accomplished by subjecting the molds to a cooling agent, preferably water. By reference to Fig. 3 it will be seen that 60 represents two pipes which are situated to throw a jet of water upon the two open portions of the blow-molds, which I term the "cooling-point." The water may be automatically turned on and off, or this may be done by the turning-out boy, as preferred. However, I deem it best that this operation be automatic, and this is accomplished by providing a turning plug M in the supply N, the turning plug being spring-actuated for normally closing and provided with an inwardly-projecting crank-arm P, which is adapted to be engaged by projections Q, which project from the edge of the table 13. As the table is being rotated the projection Q opens the valve when the molds reach the cooling-point, and it is held open while the charging operation is being performed. When the press-mold has been charged and the table is turned for bringing the next mold in position, the projection Q escapes from the arm P of the spring-actuated valve M and the valve automatically closes itself, thus cutting off the flow of water. When the succeeding open blow-mold reaches the cooling-point, this operation is repeated.

Projecting from the upper end of the column C is a bracket R, carrying at its outer end a cylinder 7, and situated in this cylinder 7 is a piston S, carrying a piston-rod T, the lower end of the piston-rod carrying a presser-head 10 and a plunger 11 of the usual construction. This presser-head is adapted to coact with the neck-rings 9, which neck-rings, as before described, are supported by the collars or bearings 50. Air-pressure is admitted to opposite ends of the cylinder 7 by means of an ordinary steam-engine-valve construction V, to the valve of which is connected an operating-rod 54 for the purpose of operating the valve and of admitting air to the opposite ends of the said cylinder. Surrounding the upper projecting end of this operating-rod 54 is an expanding spring W, which serves to normally hold the valve upward, as shown in dotted lines, Fig. 2, and to consequently normally admit air to the lower end of the cylinder for keeping the plunger normally upward.

In operation the press-mold is in an upward position and glass is placed therein. The blow-head is held to one side of the press-mold at the charging and pressing point, as illustrated in Fig. 4, by means of the cam 43. Glass having been placed in the press-mold, a downward pull upon the valve-rod 54 admits air to the upper end of the cylinder 7, and this carries the plunger downward within the glass in the press-mold and forms a pressed blank. The releasing of the rod 54 causes the withdrawal of the plunger by admitting air to the lower end of the cylinder 7. A downward pressure upon the treadle 35 then lowers the piston in the cylinder 4, and this opens outward the press-mold. The table is then turned in the direction indicated by arrow in Fig. 3, and just before the blow-mold, which was at the pressing-point, reaches the point X the blow-mold is closed through the action of the electromagnets 33 and 33' and the armature 29, and the blow-head is permitted to drop in position upon the neck-ring 9. When the press-mold is opened outward, the pressed blank is suspended by the neck-rings 9 and carried around to the point X, where it is inclosed by the blow-mold. The blow-head being dropped in position at this point and as soon as the table is started to move again for bringing the next mold in position, electric connection is made through the electric motor 21, as before explained, and air is admitted to the blow-mold through the blow-head, as before explained, and the turning and blowing operation is continued from the point X to the point Y. Just as the blank is leaving the point Y the blow-head is raised, and when the blow-mold reaches the point Z it is opened outward, leaving the blank suspended by the neck-rings, and at the point of discharging the turning-out boy removes the finished article from the neck-rings. When the open mold reaches the cooling-point, it is subjected to the action of water for cooling it, and this operation is repeated as the table is being intermittently rotated, and a finished article is produced at each intermittent movement of the table.

Having thus described my invention, what I claim, and desire to secure by Letters Patent, is—

1. A machine for the manufacture of glassware comprising an open-and-shut mold, an electric motor for opening and closing the said mold, a carrier for the said mold, and electric contacts operated by the carrier for controlling the said motor.

2. A machine for the manufacture of glassware comprising a press-mold, a blow-mold carrier, an open-and-shut blow-mold carried thereby, an electric motor operatively connected with the blow-mold for opening and closing it, a stationary electric contact in electrical communication with an electrical source, said mold-carrier carrying a contact electrically connected with the motor whereby the movement of the mold-carrier opens and closes the circuit for said motor.

3. A machine for the manufacture of glassware comprising an open-and-shut blow-mold, a carrier therefor, an electric motor operatively connected with said mold for opening and closing it, an electric circuit including a make-and-break contact operated by the mold-carrier for opening and closing the said electric circuit for operating the mold.

4. A machine for the manufacture of glassware comprising an open-and-shut blow-mold, a carrier therefor, an electric motor supported by the carrier and operatively connected with the mold for opening and closing it, an electric circuit for said motor said circuit including a make-and-break electric contact controlled by the movements of the mold-carrier.

5. A machine for the manufacture of glassware comprising an open-and-shut mold, two electromagnets, electric circuits including said magnets, make-and-break mechanisms also included in said electric circuit, and a movable armature situated between the said magnets and operatively connected with the molds for opening and closing it.

6. A machine for the manufacture of glassware comprising an open-and-shut mold, a carrier therefor, two electromagnets, electric circuits including said magnets, an armature situated between the magnets, electric switches or contacts included in said circuits for controlling them, the magnets and armature constituting a motor one of which is operatively connected with the mold for opening and closing it.

7. A machine for the manufacture of glassware comprising an open-and-shut mold, a carrier therefor, two electromagnets, an armature situated between said magnets, the armature and magnets constituting a motor and one of which is operatively connected with the mold for opening and closing it, separate electric circuits each including one of said magnets, electric switches situated in said circuits, said switches alternately operated by the movements of the mold-carrier for the purpose described.

8. A machine for the manufacture of glassware comprising an open-and-shut mold, a carrier therefor, two electromagnets supported and carried by said carrier, an armature constituting a motor operatively connected with the mold for opening and closing it, two separate electric circuits, each of which includes one of said magnets, separate electric contacts in said circuits, and carried by the mold-carrier, stationary electric contacts also in said circuits and adapted to close said circuits through the movable contact when the mold-carrier is moved.

9. A machine for the manufacture of glassware comprising a press-mold, a movable blow-mold carrier, a plurality of open-and-shut blow-molds carried thereby, a plurality of electric motors operatively connected with said blow-molds, and an electric circuit adapted to be alternatively thrown in electrical connection with said motors.

10. A machine for the manufacture of glassware comprising blow and press molds, a carrier for one of said kind of molds, the carrier constructed to stop at a pressing, discharging and charging points, electric motors connected with one kind of said molds for opening and closing them, electric contacts connected electrically with said motors, an electric circuit including stationary contacts situated between the blowing and discharging points, for the purpose described.

11. A machine for the manufacture of glassware comprising a plurality of blow-molds, a carrier therefor, vertically-movable blow-heads supported by said carrier and adapted to operate with the blow-molds, and means for raising and lowering the blow-heads by the movement of the carrier.

12. A machine for the manufacture of glassware comprising a mold, a vertically-movable head adapted to coact with the mold, a rotatable carrier for the said vertically-movable head, and means constructed and arranged to automatically raise and lower the said head by the rotation of the head-carrier.

13. A machine for the manufacture of glassware comprising a mold, a vertically-movable head adapted to coact with the mold, a laterally-movable carrier for the said head, and means constructed and arranged to raise and lower the said head by the lateral movement of the said carrier.

14. A machine for the manufacture of glassware comprising a mold, a carrier therefor, a vertically-movable head adapted to coact therewith, and a stationary member adapted to raise and lower the said head through the movement of the carrier.

15. A machine for the manufacture of glassware comprising a mold, a vertically and horizontally movable head adapted to coöperate with the mold, and mechanism constructed and arranged to raise and lower the head and to move it horizontally automatically through the movement of the said carrier.

16. A machine for the manufacture of glassware comprising a mold, a carrier, a vertically and horizontally movable head adapted to coöperate with the mold, a member adapted to raise and lower the head through the movement of the carrier, and a member constructed to move the head horizontally also through the movement of the mold-carrier.

17. A machine for the manufacture of glassware comprising a mold, a rotatable carrier therefor, a vertically-movable head adapted to coöperate with the mold, a stationary cam adapted to raise the head and to permit it to drop, the head carried by the mold-carrier to engage and disengage said cam.

18. A machine for the manufacture of glassware comprising a mold, a vertically and horizontally movable head adapted to coöperate therewith, a carrier for said mold, a cam adapted to raise and lower said head, through the movement of the carrier, and a cam adapted to move the head horizontally also through the movement of said carrier.

19. A machine for the manufacture of glassware comprising a mold, a vertically and horizontally movable head adapted to coact therewith, a vertically-arranged cam for raising and lowering the head and a horizontally-arranged cam for moving the head horizontally, and a carrier adapted to actuate the head vertically and horizontally through the action of the cams.

20. A machine for the manufacture of glassware comprising a plurality of molds, a plurality of heads adapted to coöperate respectively with said molds, and mechanism constructed and arranged to alternatively and respectively move the said heads away from and to their respective molds.

21. A machine for the manufacture of glassware comprising a plurality of molds, a carrier for said molds, a plurality of heads adapted to coöperate respectively with said molds, the heads having a vertical movement, and a member adapted to alternatively raise and lower the said heads respectively through the movement of the said carrier.

22. A machine for the manufacture of glassware comprising a plurality of molds, a plurality of vertically and horizontally movable heads adapted to coöperate respectively with said molds, and members for raising the heads and moving them horizontally respectively, and a carrier for said molds adapted by its movement to actuate the said heads vertically and horizontally alternatively when they reach a fixed point.

23. A machine for the manufacture of glassware comprising a mold, a movable head adapted to coöperate with said mold, a carrier for said mold, and an actuating member for said head situated at a fixed point and adapted to actuate the head when the carrier carries the head to said fixed point.

24. A machine for the manufacture of glassware comprising a mold, a revoluble neck-ring adapted to coöperate with the mold, a motor-carrying member, a motor carried by the said carrying member, and operative connections between the motor and the revoluble neck-ring.

25. A machine for the manufacture of glassware comprising a mold, a revoluble neck-ring adapted to coöperate therewith, a vertically-movable motor-carrying member and a motor carried thereby, and operative connections between the motor and the revoluble neck-ring.

26. A machine for the manufacture of glassware comprising a mold, a laterally-movable neck-ring carrier, a neck-ring carried thereby and adapted to coöperate with the mold, a motor operatively connected with the neck-ring, and means constructed and arranged for throwing the motor into and out of operation at a fixed point during the movement of the neck-ring carrier.

27. A machine for the manufacture of glassware comprising a mold, a plurality of neck-rings adapted to coöperate with the mold, a plurality of motors operatively connected with the said neck-rings, and means constructed and arranged to automatically throw the motors into operation when the neck-ring is coöperating with the mold.

28. A machine for the manufacture of glassware comprising a mold, a vertically-movable member, a revoluble member carried by said vertically-movable member and adapted to coöperate with a neck-ring, a motor operatively connected with the revoluble member, and means constructed and arranged to throw the motor into operation by the vertical movement of the movable member when it is lowered.

29. A machine for the manufacture of glassware comprising a mold, a vertically-movable member, a revoluble member carried by said vertically-movable member and adapted to coöperate with a neck-ring, an electric motor operatively connected with the said revoluble member, an electric circuit including said motor, and a switch included in said circuit operated by the vertical movement of the said vertically-movable member for the purpose of opening and closing the said circuit.

30. A machine for the manufacture of glassware comprising a mold, a vertically and horizontally movable member, a revoluble member carried by said vertically and horizontally movable member, a motor operatively connected with the revoluble member, an electric circuit including said motor, and stationary and movable contacts within the said circuit, the movable contact carried by the vertically-movable member whereby the movement of the vertically-movable member opens and closes said circuit.

31. A machine for the manufacture of glassware comprising a mold, a neck-ring, one of said members being revoluble, a motor-carrier, a motor carried by said carrier, operative connections between said motor and the revoluble member, and means constructed and arranged to throw the motor in and out of operation by the movement of the carrier.

32. A machine for the manufacture of glassware comprising a mold, a rotatable neck-ring, a support independent of the mold for said neck-ring upon which it revolves, and a motor operatively connected with the neck-ring for revolving it.

33. A machine for the manufacture of glassware comprising a mold, a revoluble neck-ring operatively connected therewith, a carrier for the mold, an electric motor operatively connected with the neck-ring, an electric circuit for said motor, and a switch connection included in said circuit adapted to be actuated by the movement of the carrier for making and breaking the circuit.

34. A machine for the manufacture of glassware comprising a plurality of molds, a plurality of neck-rings adapted to coöperate therewith, a plurality of revoluble heads adapted to interlock with said neck-rings, a plurality of electric motors operatively connected respectively with said heads, an electric circuit, an electric contact electrically connected with said motors respectively, and adapted to alternatively close and open the electric connection with said motor, for the purpose described.

35. A machine for the manufacture of glassware comprising a plurality of molds, a plurality of rotatable neck-rings adapted to coöperate with the molds, a plurality of heads operatively connected with the neck-rings, a plurality of motors operatively connected with the heads, an electrical source, a plurality of electric circuits one for each motor respectively, contacts for said motor-circuits, and a carrier for said molds and motors whereby the circuit is alternatively opened and closed for said motors for the purpose described.

In testimony whereof I have hereunto set my hand in the presence of two subscribing witnesses.

CHARLES EDWIN BLUE.

Witnesses:
 NELSON C. HUBBARD,
 W. V. HOGE, Jr.